US012380730B2

(12) United States Patent
Suda et al.

(10) Patent No.: US 12,380,730 B2
(45) Date of Patent: Aug. 5, 2025

(54) AUTHENTICATION DEVICE, AUTHENTICATION METHOD, AND COMPUTER READABLE STORAGE MEDIUM

(71) Applicant: SoftBank Corp., Tokyo (JP)

(72) Inventors: Kazuto Suda, Tokyo (JP); Yuko Ishiwaka, Tokyo (JP); Shun Ogawa, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/942,794

(22) Filed: Nov. 11, 2024

(65) Prior Publication Data

US 2025/0069436 A1   Feb. 27, 2025

Related U.S. Application Data

(63) Continuation of application No. PCT/JP2023/033892, filed on Sep. 19, 2023.

(30) Foreign Application Priority Data

Nov. 2, 2022   (JP) ................. 2022-176208

(51) Int. Cl.
*G06V 40/16*   (2022.01)
*G06V 10/24*   (2022.01)
(Continued)

(52) U.S. Cl.
CPC ............ *G06V 40/172* (2022.01); *G06V 10/24* (2022.01); *G06V 10/82* (2022.01); *G06V 20/46* (2022.01); *G06V 40/171* (2022.01)

(58) Field of Classification Search
CPC ...... G06V 40/172; G06V 10/24; G06V 10/82; G06V 20/46; G06V 40/171; G06V 20/52; G06T 7/00
See application file for complete search history.

(56) References Cited

U.S. PATENT DOCUMENTS

2020/0349372 A1   11/2020   Lee
2021/0312203 A1*  10/2021   Patzwaldt .............. G06V 10/24
(Continued)

FOREIGN PATENT DOCUMENTS

JP   2005316888 A   11/2005
JP   2020154408 A   9/2020
(Continued)

OTHER PUBLICATIONS

Taco S. Cohen et. al.,Spherical CNNs, Proceedings of the 6th International Conference on Learning Representations(ICLR) 2018, DOI: 10.48550/arXiv.1801.10130.
(Continued)

*Primary Examiner* — Wesley J Tucker

(57) ABSTRACT

Provided is an authentication device comprising: a data acquisition unit that acquires spherical data including a video of a person taken by a fisheye camera; and an authentication performing unit that performs facial recognition performed by a spherical convolutional neural network on the spherical data. Provided is an authentication device comprising: a data acquisition unit that acquires spherical data including a video of a person taken by a fisheye camera; and an authentication performing unit that performs facial recognition performed by a convolutional neural network on a sub-image after extracting, from the spherical data, the sub-image of a portion of a face of the person, adjusting an orientation of the face of the person in the sub-image, and applying, on the sub-image, a distortion correction process that corrects distortion generated by the fisheye camera.

10 Claims, 5 Drawing Sheets

(51) Int. Cl.
    *G06V 10/82*        (2022.01)
    *G06V 20/40*        (2022.01)

(56) References Cited

U.S. PATENT DOCUMENTS

| | | | |
|---|---|---|---|
| 2022/0172508 A1 | 6/2022 | Suzuki | |
| 2022/0292279 A1* | 9/2022 | Li | G06V 40/172 |
| 2024/0087365 A1* | 3/2024 | Pylvaenaeinen | G06V 10/762 |
| 2024/0296213 A1* | 9/2024 | Ishiwaka | G06F 21/32 |
| 2024/0310904 A1* | 9/2024 | Lu | G06V 10/82 |
| 2025/0029346 A1* | 1/2025 | Vircíková | G06V 10/54 |

FOREIGN PATENT DOCUMENTS

| | | | |
|---|---|---|---|
| JP | 2020184331 A | 11/2020 |
| JP | 2020201880 A | 12/2020 |
| JP | 2021170205 A | 10/2021 |

OTHER PUBLICATIONS

International Search Report and Written Opinion (ISA/237) of the International Search Authority for International Patent Application No. PCT/JP2023/033892, mailed by the Japan Patent Office on Nov. 28, 2023.

* cited by examiner

AUTHENTICATION DEVICE, AUTHENTICATION METHOD, AND COMPUTER READABLE STORAGE MEDIUM

The contents of the following patent application(s) are incorporated herein by reference:
NO. 2022-176208 filed in JP on Nov. 2, 2022
NO. PCT/JP2023/033892 filed in WO on Sep. 19, 2023

BACKGROUND

1. Technical Field

The present invention relates to an authentication device, an authentication method, and a computer readable storage medium.

2. Related Art

Patent Document 1 describes a technique for acquiring a face image of a user and authenticating the user by using information related to the feature point included in the face image. Non-Patent Document 1 describes a spherical convolutional neural network (SCNN: Spherical Convolutional Neural Network) specialized for image data on a spherical surface.

PRIOR ART DOCUMENT

Patent Document

Patent Document 1: Japanese Patent Application Publication No. 2021-170205

Non-Patent Document

Non-Patent Document 1: Taco S. Cohen, Mario Geiger, Jonas Koehler, Max Welling, Spherical CNNs, ICLR 2018

DESCRIPTION OF EXEMPLARY EMBODIMENTS

In a conventional face authentication system, for example, people need to bring their own face in front of a camera by stooping, stretching, etc. in front of the camera. Moreover, for this reason, a plurality of types of devices are required to be set for a person who is tall or low. In an authentication system 10 according to the present embodiment, to mitigate the issue, a facial recognition method which is performed by acquiring a wide angle video using a camera with fisheye lens mounted thereon may be adopted. In the authentication system 10, for example, a ceiling and a fisheye camera on a platform are installed (a sensor and the like for measuring a distance may be installed, if required), a distorted video generated by the fisheye camera is acquired, the distorted video is converted into spherical data based on a projection rule (preferably, spherical data is directly acquired from the fisheye camera), and tracking is performed by identifying the position of the face of the person (applying a Bounding Box or the like) from data on a spherical surface. If the tracked person passes a boundary, or as long as the distance is estimated and then a SCNN can be directly processed from a person who is the closest from the fisheye camera, the authentication system 10 performs the facial recognition by using the SCNN. If there is a problem and the like in using the SCNN, the face authentication system 10 performs the facial recognition using a typical CNN with Defish Eye (projecting an object on a plane surface by a center projection rule) being locally performed on a range within the Bounding Box. In the authentication system 10, a result of the facial recognition may control whether to open or not open a gate, or may be reported to a person in charge of security or an investigative organization.

Hereinafter, the present invention will be described through embodiments of the present invention, but the following embodiments do not limit the present invention according to claims. In addition, not all of the combinations of features described in the embodiments are essential to the solution of the invention.

Figure 1:
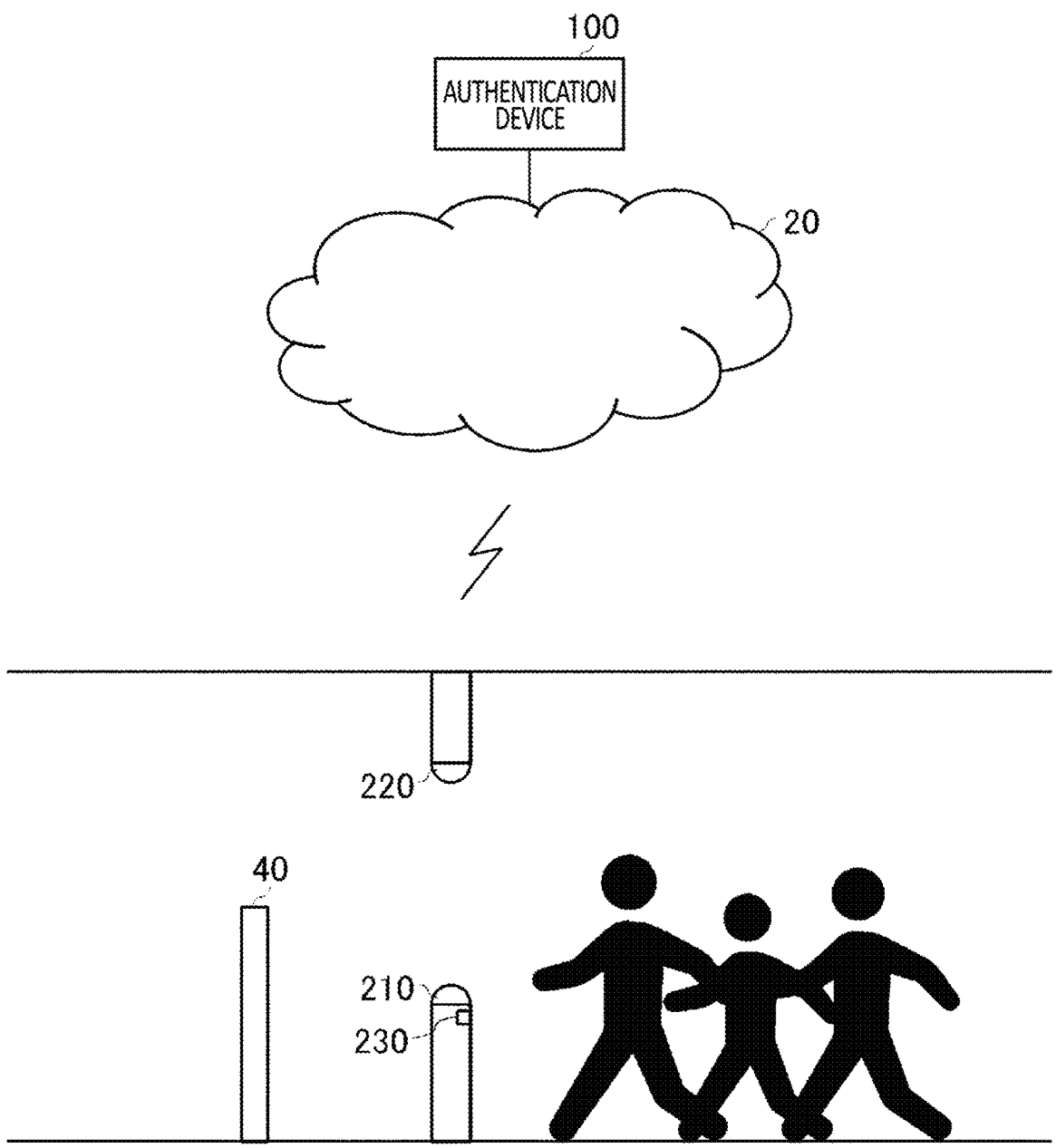
FIG. 1 schematically shows an example of an authentication system 10.

FIG. 1 schematically shows an example of an authentication system 10. The authentication system 10 may be a system that performs facial recognition of a person.

The authentication system 10 includes an authentication device 100. The authentication system 10 may include a camera 210. The authentication system 10 may include a camera 220. The authentication system 10 may include a distance-measurement sensor 230.

The authentication system 10 may only include the camera 210 and the camera 220 among the camera 210, the camera 220, and the distance-measurement sensor 230, may only include the camera 210 and the distance-measurement sensor 230, or may only include the camera 220 and the distance-measurement sensor 230. Moreover, as another embodiment, the authentication system 10 may only include the camera 210 among the camera 210, the camera 220, and the distance-measurement sensor 230, or may only include the camera 220.

The camera 210 and the camera 220 may respectively be a fisheye camera having fisheye lens. The camera 220 may be arranged at a position higher than that of the camera 210. For example, the camera 210 is arranged on a lower side, and the camera 220 is arranged on an upper side. As a specific example, as illustrated in FIG. 1, the camera 210 is arranged on a platform that is installed on a lower side, and the camera 220 is arranged on a ceiling side. The camera 210 and the camera 220 may be arranged such that a blind spot is not generated on a face of a person passing through a vicinity of the camera 210 and the camera 220. The camera 210 may be an example of a first fisheye camera, and the camera 220 may be an example of a second fisheye camera.

The distance-measurement sensor 230 measures the distance between the distance-measurement sensor 230 and the person. The distance-measurement sensor 230 may be installed near the camera 210 or the camera 220. Moreover, the distance-measurement sensor 230 may be installed at a gate 40 or near the gate 40.

The authentication device 100 acquires spherical data including a video of a person taken by the camera 210. For example, the authentication device 100 receives, from the camera 210, the spherical data generated by the camera 210. For example, the authentication device 100 receives, from the camera 210, the data of the video of the person taken by the camera 210, and generates spherical data from the received data.

As illustrated in FIG. 1, the authentication device 100 and the camera 210 may communicate with each other via the network 20. Note that the authentication device 100 may communicate with the camera 210 without the network 20. For example, the authentication device 100 is arranged near a location in which the camera 210 is installed, and communicates with the camera 210 in a wired or wireless manner.

The authentication device 100 acquires spherical data including a video of a person taken by the camera 220. For example, the authentication device 100 receives, from the camera 220, the spherical data generated by the camera 220. For example, the authentication device 100 receives, from the camera 220, the data of the video of the person taken by the camera 220, and generates spherical data from the received data.

As illustrated in FIG. 1, the authentication device 100 and the camera 220 may communicate with each other via the network 20. Note that the authentication device 100 may communicate with the camera 220 without the network 20. For example, the authentication device 100 is arranged near a location in which the camera 220 is installed, and communicates with the camera 220 in a wired or wireless manner.

The authentication device 100 acquires the distance between the camera and the person which is measured by the distance-measurement sensor 230. The authentication device 100 receives, from the distance-measurement sensor 230, the distance between the camera and the person measured by the distance-measurement sensor 230.

As illustrated in FIG. 1, the authentication device 100 and the distance-measurement sensor 230 may communicate with each other via the network 20. Note that the authentication device 100 may communicate with the distance-measurement sensor 230 without the network 20. For example, the authentication device 100 is arranged near a location in which the distance-measurement sensor 230 is installed, and communicates with the distance-measurement sensor 230 in a wired or wireless manner.

The network 20 may include the Internet. The network 20 may include a LAN (Local Area Network). The network 20 may include a mobile communication network. The mobile communication network may conform to any of the 3G (3rd Generation) communication system, the LTE (Long Term Evolution) communication system, the 5G (5th Generation) communication system, and the 6G (6th Generation) communication system and the communication system of the subsequent generation.

The authentication device 100 may be connected to the network 20 via a wired connection. The authentication device 100 may be connected to the network 20 via a wireless connection. The authentication device 100 may be connected to the network 20 via a wireless base station. The authentication device 100 may be connected to the network 20 via a Wi-Fi (registered trademark) access point.

The camera 210 may be connected to the network 20 via a wired connection. The camera 210 may be connected to the network 20 via a wireless connection. The camera 210 may be connected to the network 20 via a wireless base station. The camera 210 may be connected to the network 20 via a Wi-Fi access point.

The camera 220 may be connected to the network 20 via a wired connection. The camera 220 may be connected to the network 20 via a wireless connection. The camera 220 may be connected to the network 20 via a wireless base station. The camera 220 may be connected to the network 20 via a Wi-Fi access point.

The distance-measurement sensor 230 may be connected to the network 20 via a wired connection. The distance-measurement sensor 230 may be connected to the network 20 via a wireless connection. The distance-measurement sensor 230 may be connected to the network 20 via a wireless base station. The distance-measurement sensor 230 may be connected to the network 20 via a Wi-Fi access point.

The authentication device 100 performs facial recognition of the person taken by the camera 210 and the camera 220. Conventionally, facial recognition using a typical CNN is performed on a plane image taken by a typical camera rather than a spherical image taken by a fisheye camera, for example. There is a demand for an authentication process on a spherical image, and thus it is possible to apply a method applying a typical CNN after converting a spherical image into a plane image, but there is a problem in the authentication precision and the like because various distortions are generated by the converting. Moreover, when an operation in the typical CNN exhibits a great performance in the longitudinal or lateral parallel movement because the operation has translation symmetry, but because the operation does not have a rotational symmetry, the operation may misjudge the same objects as different objects in a case of an image of an object with its orientation rotating such as the spherical image.

On the contrary, the SCNN is characterized as being specialized for the spherical data, and robust for the rotation. In Non-Patent Document 1, a test using MNIST that is rotated is performed for a performance comparison between a typical CNN and SCNN. A correct answer rate in an approach using the CNN when training data and test data are rotated is 11%, which is not different from a case in which answers are almost made by guesswork, but a correct answer rate for the SCNN is 95%. This depends on that the CNN has translation symmetry and is thus great in vertical and horizontal parallel movements but does not have a rotational symmetry and is thus exhibits a weak performance in rotation conversion while the SCNN has a rotational symmetry.

The authentication device 100 according to the present embodiment performs facial recognition performed by the SCNN. In this manner, sufficient authentication precision can be achieved on the spherical data.

The authentication device 100 may separately use the facial recognition performed by the SCNN and the facial recognition performed by the CNN.

Figure 2:
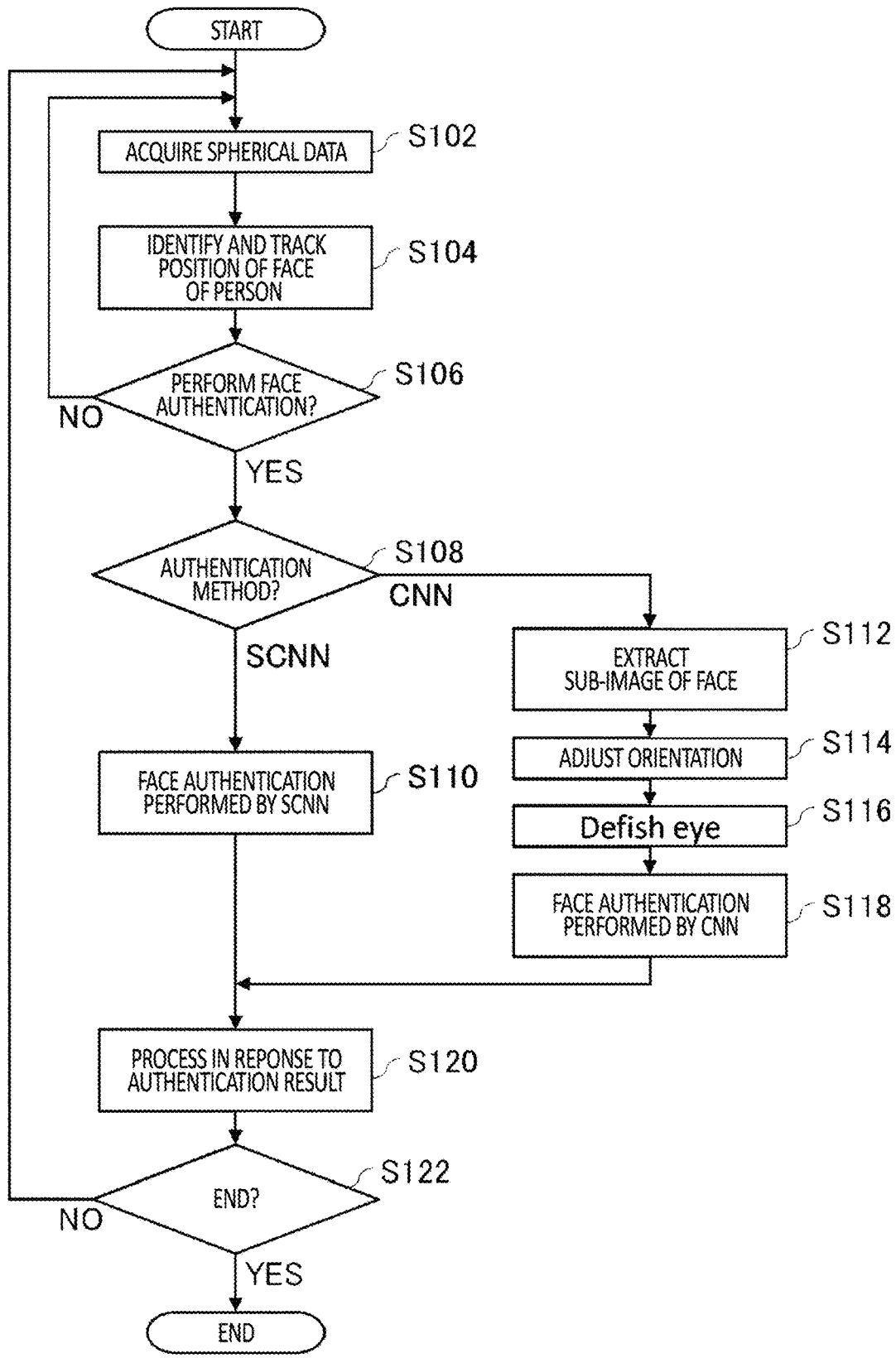
FIG. 2 schematically shows an example of a process flow of an authentication device 100.

FIG. 2 schematically shows an example of a process flow of an authentication device 100. Here, a process flow is described, in which the authentication device 100 detects a person approaching a gate 40 by the captured image obtained by a camera 210 and a camera 220 and performs facial recognition of the person approaching the gate 40, to perform a process opening the gate 40 when the authentication is approved.

In step (step may be abbreviated as S) 102, the authentication device 100 acquires spherical data including a video of a person taken by the camera 210 and the camera 220. In S104, the authentication device 100 identifies a position of a face of the person from the spherical data, to perform tracking.

In S106, the authentication device 100 determines whether to perform facial recognition of the person from a tracking status of the person. For example, the authentication device 100 determines to perform the facial recognition of the person when the person who is tracked passes a boundary that is virtually set in front of the gate 40. For example, the authentication device 100 determines to perform the facial recognition for a person who is the closest from the gate 40 or the camera 210 and the camera 220, among a plurality of people included in the spherical data.

When it is determined not to perform the facial recognition (NO in S106), the process returns to S102, and when it is determined to perform the facial recognition (YES in S106), the process proceeds to S108. In S108, the authentication device 100 determines whether to perform any of the facial recognition performed by the SCNN or the facial recognition performed by the CNN. When it is determined to perform the facial recognition performed by the SCNN, the process proceeds to S110, and when it is determine to perform the facial recognition performed by the CNN, the process proceeds to S112.

In S110, the authentication device 100 performs the facial recognition performed by the SCNN on the spherical data acquired in S102.

In S112, the authentication device 100 extracts a sub-image of a portion of the face of the person to be authenticated from the spherical data acquired in S102. In S114, the authentication device 100 adjusts an orientation of the face of the person in the sub-image that is extracted in S112. The authentication device 100 detects, for example, eyes, a nose, and a mouth of the person, and adjusts the orientation of the face of the person so that the jaw is on the lower side and the head peak part is on the upper side.

In S116, the authentication device 100 locally performs Defish eye on the spherical data. The Defish eye may be a distortion correction process that corrects distortion generated by a fisheye camera. The authentication device 100 may perform the Defish eye for the sub-image obtained by adjusting the orientation of the face of the person in S114.

In S118, the authentication device 100 performs the facial recognition performed by the CNN for the sub-image to which the Defish eye was performed in S116.

In S120, the authentication device 100 performs a process in response to an authentication result. The authentication device 100 controls the gate 40 to open the gate 40 when the authentication for the person to be authenticated is OK and not to open the gate 40 when the authentication is NG.

In S122, the authentication device 100 determines whether to end the authentication process. The authentication device 100, for example, determines to end the authentication process when an end instruction by an administrator and the like of the authentication system 10 is received. When the authentication process is not ended, return to S102.

Figure 3:
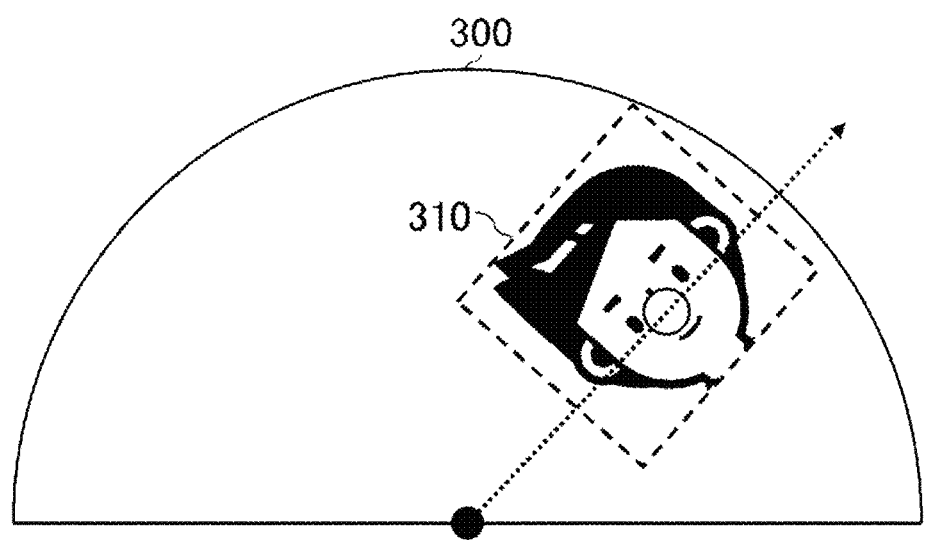
FIG. 3 is an illustration for describing a pretreatment to a CNN by an authentication device 100.

FIG. 3 is an illustration for describing a pretreatment to a CNN by an authentication device 100. In spherical data 300, as illustrated in FIG. 3, an image of a face is included in a state in which the orientation of the face is rotated with respect to a typical orientation so that the jaw is positioned on the lower side and the head peak part is positioned on the upper side, and in a state in which distortion is generated on the image. The authentication device 100 performs the authentication by cutting off a sub-image 310 of a portion of the face of a person from the spherical data 300, adjusting the orientation, converting the sub-image 310 into a plane image according to a projection rule mainly for a range in which the face is captured, and inputting data into a CNN for a typical facial recognition. This is an application which difficult to express a global map appropriately in a plane drawing while keeping the distance or the angle, for example, but as long as the map is a Japanese map, the map can be expressed on a plane surface with better precision.

As a specific example, as illustrated in FIG. 3, the authentication device 100 projects a face image on a tangential plane of a spherical surface near the nose of the person in the sub-image 310 (center projection manner of a typical camera). The authentication device 100 uses a Bounding box or the like, and corrects the distortion of the sub-image 310 by using tracking and a coordinate system in which data within a range thereof is the center of the Bounding box.

In a conventional face authentication system, facial recognition has been performed by people to be authenticated by standing in line in front of a camera, sequentially going toward the camera, and adjusting their own orientations of faces for being captured. On the contrary, according to the authentication device 100, by increasing a degree of freedom of a position of the person to be authenticated by using a fisheye camera, it is possible to eliminate the need to stand in line in front of the camera and sequentially go toward the camera, by performing the SCNN or performing the CNN after performing a pretreatment, facial recognition with a sufficient precision can be achieved on the spherical data obtained by the fisheye camera.

Figure 4:
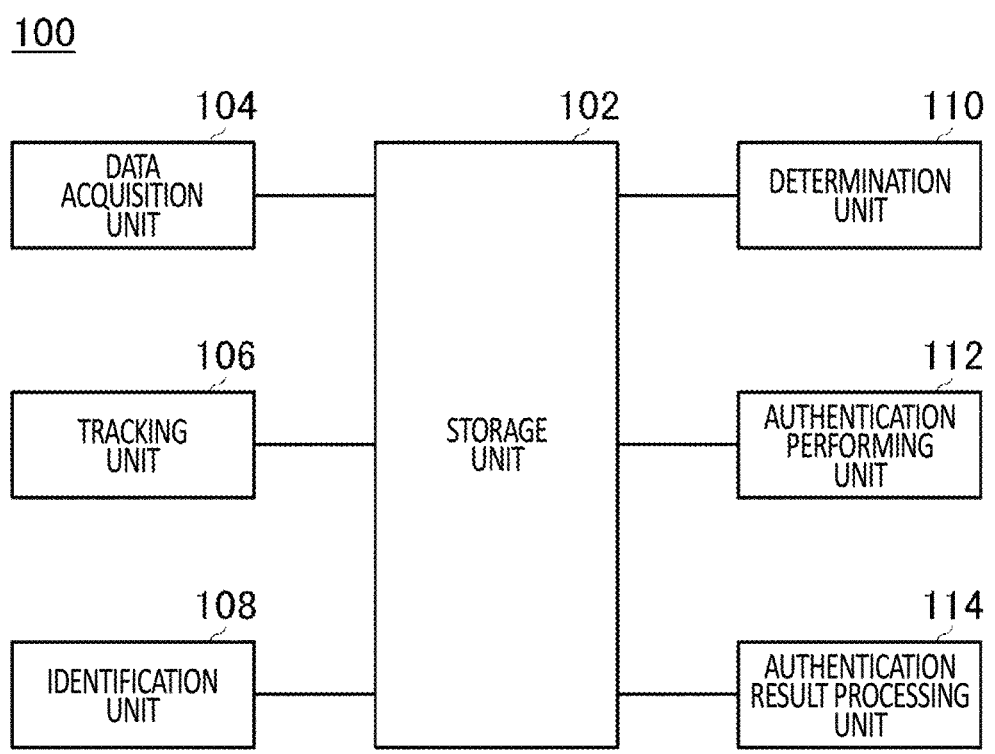
FIG. 4 schematically shows an example of a functional configuration of an authentication device 100.

FIG. 4 schematically shows an example of a functional configuration of an authentication device 100. The authentication device 100 includes a storage unit 102, a data acquisition unit 104, a tracking unit 106, an identification unit 108, a determination unit 110, an authentication performing unit 112, and an authentication result processing unit 114. The storage unit 102 stores various types of data.

The data acquisition unit 104 acquires various types of data. The data acquisition unit 104 stores the acquired data in the storage unit 102.

The data acquisition unit 104 acquires spherical data including a video of a person taken by a fisheye camera. For example, the data acquisition unit 104 receives, from the camera 210, the spherical data generated by the camera 210. For example, data acquisition unit 104 receives, from the camera 210, the data of the video of the person taken by the camera 210, and generates spherical data from the received data based on a projection rule. For example, the data acquisition unit 104 receives, from the camera 220, the spherical data generated by the camera 220. For example, data acquisition unit 104 receives, from the camera 220, the data of the video of the person taken by the camera 220, and generates spherical data from the received data based on a projection rule.

The data acquisition unit 104 acquires the distance between a person within an image-capturing range of the fisheye camera and the fisheye camera, the distance-measurement sensor 230, and the like. The data acquisition unit 104 calculates, for example, the distance of the person from the camera 210 and the camera 220, by the captured image obtained by the camera 210 and the camera 220. The data acquisition unit 104 may calculate the distance of the person from the camera 210 and the camera 220 by using the camera 210 and the camera 220 as stereoscopic cameras. For example, the data acquisition unit 104 acquire, from the distance-measurement sensor 230, the distance between the distance-measurement sensor 230 and the person that is measured by the distance-measurement sensor 230.

The tracking unit 106 tracks the position of the face of the person included in the spherical data that is continuously acquired by the data acquisition unit 104. The tracking unit 106 may track the position by applying a Bounding box on the face of the person included in the spherical data. The tracking unit 106 may identify the position of the face of the person included in the spherical data by using the SCNN on the spherical data. The tracking unit 106 may identify the position of the face of the person included in the spherical data by using various types of approaches having rotational symmetry such as Capsule Network, for example.

The tracking unit 106 may determine the moving speed of the person included in the spherical data, and store the moving speed in the storage unit 102. The tracking unit 106 may determine the moving speed of the person included in the spherical data by analyzing the spherical data that is continuously acquired by the data acquisition unit 104.

The tracking unit 106 may calculate a value that is related to the number of people included in the spherical data, and stores the number in the storage unit 102. For example, the tracking unit 106 stores, in the storage unit 102, number of people data indicating the number of people included in the spherical data. For example, the tracking unit 106 stores, in the storage unit 102, population density information indicating population density of people included in the spherical data.

The identification unit 108 identifies a person who is an object to which an authentication process is to be performed based on a tracking result obtained by the tracking unit 106.

The identification unit 108 sets a virtual boundary around the camera 210 and the camera 220, for example. As a specific example, the identification unit 108 sets a virtual boundary in front of a gate when the authentication is performed on a person passing the gate. Then, the identification unit 108 identifies, based on the tracking result obtained by the tracking unit 106, the person as an object to undergo the authentication process, when the person passes the boundary.

Moreover, for example, the identification unit 108 identifies a person as an object to undergo the authentication process based on the distance between a person within an image-capturing range of the fisheye camera and the fisheye camera, the distance-measurement sensor 230, and the like, the distance being acquired by the data acquisition unit 104. For example, the identification unit 108 identifies a person whose distance is the closest to the fisheye camera among the people included in an image-capturing range of the fisheye camera as an object to which the authentication process is performed. The identification unit 108 may identify a person whose distance is shorter than a preset distance threshold among a plurality of people as an object to undergo the authentication process.

For the person identified by the identification unit 108, the determination unit 110 determines whether to perform facial recognition performed by the SCNN or perform facial recognition performed by the CNN. That is, for the person identified by the identification unit 108, the determination unit 110 may determine whether to perform the facial recognition using the CNN that is specialized for the spherical surface or perform the facial recognition using the CNN that is not specialized for the spherical surface. Being specialized for the spherical surface may mean corresponding to distortion and rotation, and not being specialized for the spherical surface may mean not corresponding to distortion and rotation. The facial recognition performed by the CNN described herein may be the facial recognition using the CNN that is not specialized for the spherical surface, for example, may be a facial recognition using the CNN other than the SCNN.

The authentication performing unit 112 performs the facial recognition performed by the SCNN on the spherical data acquired by the data acquisition unit 104. Because the SCNN is specialized for the spherical surface, the facial recognition can be performed with high precision for the person included in the spherical data acquired by the data acquisition unit 104.

The authentication performing unit 112 may perform the facial recognition performed by the SCNN for the person identified by the identification unit 108. For the person identified by the identification unit 108 among people tracked by the tracking unit 106, by performing facial recognition performed by the SCNN on the spherical data including the person, the authentication can be performed with high precision, for example, on a person approaching the gate among a plurality of people included in a wide range that is captured by the fisheye camera.

The authentication performing unit 112 may perform the facial recognition performed by the SCNN on the spherical data when the determination unit 110 determines that the facial recognition performed by the SCNN is performed. The authentication performing unit 112 may apply pretreatment on the spherical data when the determination unit 110 determines that the facial recognition performed by the CNN is performed. For example, the authentication performing unit 112 applies a distortion correction process that extracts a sub-image of a portion of the face of the person identified by the identification unit 108 from the spherical data, adjusts the orientation of the face of the person in the sub-image, and corrects distortion on the sub-image that is generated by the fisheye camera. The authentication performing unit 112 may perform the facial recognition performed by the CNN on the sub-image after applying the pretreatment.

For example, the determination unit 110 determines that the facial recognition performed by the SCNN is performed when a security level of the authentication system 10 requested for the facial recognition is a first level, and determines that the facial recognition performed by the CNN is performed when a security level of the authentication system 10 requested for the facial recognition is a second level that is higher than the first level. In the case of the facial recognition performed by the SCNN and the CNN to which the pretreatment is applied by the authentication performing unit 112, the former has a processing load less than that of the latter, while the latter can achieve authentication precision higher than that of the former. When the requested security level is higher, high authentication precision is required despite the high processing load, thereby a determination can be performed corresponding to such actual circumstances according to the determination unit 110.

For example, the determination unit 110 may determine whether to perform the facial recognition performed by the SCNN or perform the facial recognition performed by the CNN based on the moving speed of the person who is an object determined by the tracking unit 106, to which the authentication process is to be performed. For example, the determination unit 110 determines that the facial recognition performed by the SCNN is performed when the moving speed of the person who is the object that is an object to which the authentication process is to be performed is faster than a predetermined threshold, and determines that the facial recognition performed by the CNN is performed when the moving speed is slower than the threshold. In this manner, when the moving speed of the person who is the object is fast, the possibility of generating an event in which an error occurs because the authentication is not made in time due to the fast moving speed of the person who is the object can be reduced by performing the facial recognition performed by the SCNN that has a processing load less than that of the facial recognition performed by the CNN and that can output a result faster, and when the moving speed of the person who is the object is slow, high authentication precision can be achieved.

For example, the determination unit 110 determines whether to perform the facial recognition performed by the SCNN or perform the facial recognition performed by the CNN based on a value related to a number of people within an image-capturing range of the fisheye camera. For example, the determination unit 110 determines that the facial recognition performed by the SCNN is performed when the value related to the number of people within the image-capturing range of the fisheye camera is greater than a predetermined threshold, and determines that the facial recognition performed by the CNN is performed when the value is less than the threshold. In this manner, when the number of people who are the objects is large, the possibility of generating an event in which an error occurs because the authentication is not made in time for any person can be reduced by performing the facial recognition performed by the SCNN that has a processing load less than that of the facial recognition performed by the CNN, and when the number of people who are the objects is small, high authentication precision can be achieved.

When the authentication system 10 includes the camera 210 and the camera 220, the data acquisition unit 104 acquires first spherical data including a video taken by the camera 210 and second spherical data including a video taken by the camera 220. The authentication performing unit 112 performs facial recognition for at least any of the first spherical data or the second spherical data when the facial recognition performed by the SCNN is performed.

For example, the authentication performing unit 112 performs the facial recognition by using both the first spherical data and the second spherical data. As a specific example, the authentication performing unit 112 determines a final authentication result by performing the facial recognition performed by an SCNN on the first spherical data, performing the facial recognition performed by the SCNN on the second spherical data, and merging the results. Moreover, as a specific example, the authentication performing unit 112 adopts a result having a higher precision of result as the final authentication result by performing the facial recognition performed by the SCNN on the first spherical data and performing the facial recognition performed by the SCNN on the second spherical data.

For example, the authentication performing unit 112 selects one of the first spherical data or the second spherical data and then performs the facial recognition by using the selected one. For example, the authentication performing unit 112 selects the first spherical data or the second spherical data from the first spherical data or the second spherical data depending on the reflection state of the face of the person to be authenticated. As a specific example, the authentication performing unit 112 selects the first spherical data or the second spherical data, the selected data including an area in the face of the person to be authenticated that is greater than another data. Moreover, for example, the authentication performing unit 112 selects the first spherical data or the second spherical data, the selected data including a greater number of parts, i.e., eyes, nose, and mouth, of the person to be authenticated, than another data.

Figure 5:
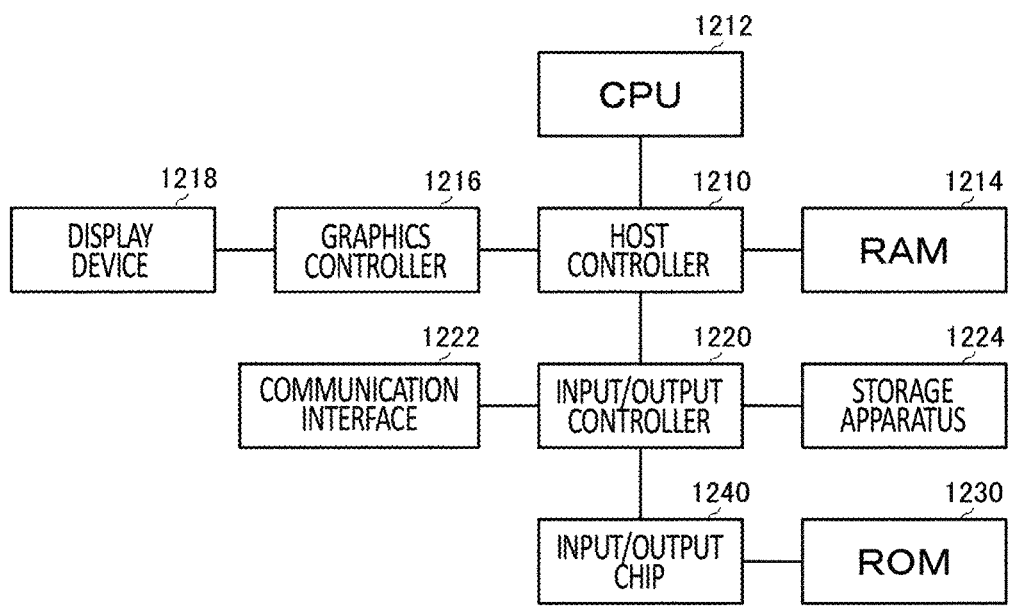
FIG. 5 schematically shows an example of a hardware configuration of a computer 1200 which functions as the authentication device 100.

FIG. 5 schematically shows an example of a hardware configuration of a computer 1200 which functions as the authentication device 100. A program installed in the computer 1200 can cause the computer 1200 to function as one or more "units" of an apparatus according to the present embodiment, or cause the computer 1200 to perform operations associated with the apparatus or perform one or more "units" thereof according to the present embodiment, and/or cause the computer 1200 to perform the process according to the present embodiment or perform the steps of the process. Such a program may be executed by a CPU 1212 to cause the computer 1200 to execute specific operations associated with some or all of the blocks in the flowcharts and block diagrams described in the present specification.

The computer 1200 according to the present embodiment includes the CPU 1212, a RAM 1214, and a graphics controller 1216, which are connected to each other via a host controller 1210. The computer 1200 also includes input/output units such as a communication interface 1222, a storage apparatus 1224, a DVD drive and an IC card drive, which are connected to the host controller 1210 via an input/output controller 1220. The DVD drive may be a DVD-ROM drive, a DVD-RAM drive, etc. The storage apparatus 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates in accordance with the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with another electronic device via a network. The storage apparatus 1224 stores a program and data used by the CPU 1212 in the computer 1200. The DVD drive reads the programs or the data from the DVD-ROM or the like, and provides the storage apparatus 1224 with the programs or the data. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer readable storage medium such as the DVD-ROM or the IC card. The program is read from the computer readable storage medium, installed into the storage apparatus 1224, RAM 1214, or ROM 1230, which are also examples of a computer readable storage medium, and executed by the CPU 1212. Information processing described in these programs is read by the computer 1200, and provides cooperation between the programs and the various types of hardware resources described above. An apparatus or method may be configured by achieving the operation or processing of information in accordance with the usage of the computer 1200.

For example, if a communication is executed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage apparatus 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage apparatus 1224, the DVD drive (DVD-ROM), the IC card, etc., and perform various types of processing on the data on the RAM 1214. Next, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information search/replacement, or the like described throughout the present disclosure and designated by instruction sequences of the programs, to write the results back to the RAM 1214. In addition, the CPU 1212 may search for information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute that satisfies a predetermined condition.

The above described program or software modules may be stored in the computer readable storage medium on or near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent stages of processes in which operations are executed or "units" of apparatuses responsible for executing operations. A specific stage and "unit" may be implemented by dedicated circuit, programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and another logical operation, and a flip-flop, a register, and a memory element, such as a field programmable gate array (FPGA), a programmable logic array (PLA), or the like.

The computer readable storage medium may include any tangible device capable of storing an instruction executed by an appropriate device, so that the computer readable storage medium having the instruction stored thereon constitutes a product including an instruction that may be executed in order to provide means for executing an operation designated by a flowchart or a block diagram. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, or the like, and a conventional procedural programming language such as a "C" programming language or a similar programming language.

The computer readable instruction may be provided to a general purpose computer, a special purpose computer, or a processor or programmable circuit of another programmable data processing apparatus locally or via a local area network (LAN), a wide area network (WAN) such as the Internet or the like in order that the general purpose computer, the special purpose computer, or the processor or the programmable circuit of another programmable data processing apparatus executes the computer readable instruction to generate means for executing operations designated by the flowchart or the block diagram. Examples of the processor include a computer processor, a central processing unit (CPU), a processing unit, a microprocessor, a digital signal processor, a controller, a microcontroller, and the like.

While the present invention has been described with the embodiments, the technical scope of the present invention is not limited to the above-described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: authentication system;
20: network;
40: gate;
100: authentication device;
102: storage unit;

104: data acquisition unit;
106: tracking unit;
108: identification unit;
110: determination unit;
112: authentication performing unit;
114: authentication result processing unit;
210: camera;
220: camera;
230: distance-measurement sensor;
300: spherical data;
310: sub-image;
1200: computer;
1210: host controller;
1212: CPU;
1214: RAM;
1216: graphics controller;
1218: display device;
1220: input/output controller;
1222: communication interface;
1224: storage apparatus
1230: ROM;
1240: input/output chip.

What is claimed is:

1. An authentication device comprising:
a data acquisition unit that acquires spherical data including a video of a person taken by a fisheye camera;
a tracking unit that tracks a position of a person included in the spherical data that is continuously acquired by the data acquisition unit;
an identification unit that identifies, based on a tracking result obtained by the tracking unit, a person who is an object to which an authentication process is to be performed;
a determination unit that determines, for the person identified by the identification unit, whether to perform facial recognition performed by a spherical convolutional neural network or perform facial recognition performed by a convolutional neural network; and
an authentication performing unit that, for the person identified by the identification unit. performs facial recognition performed by the spherical convolutional neural network on the spherical data, when the determination unit determines that the facial recognition performed by the spherical convolutional neural network is performed.

2. The authentication device according to claim 1, wherein when the determination unit determines that the facial recognition performed by the convolutional neural network is performed, the authentication performing unit performs facial recognition performed by the convolutional neural network on a sub-image after extracting, from the spherical data, the sub-image of a portion of a face of the person identified by the identification unit, adjusting an orientation of the face of the person in the sub-image, and applying, on the sub-image, a distortion correction process that corrects distortion generated by the fisheye camera.

3. The authentication device according to claim 2, wherein the convolutional neural network is a convolutional neural network that is not specialized for a spherical surface.

4. The authentication device according to claim 3, wherein the convolutional neural network is a convolutional neural network that is not the spherical convolutional neural network.

5. The authentication device according to claim 2, wherein when a security level requested for the facial recognition is a first level, the determination unit determines that the facial recognition performed by the spherical convolutional neural network is performed, and when a security level requested for the facial recognition is a second level that is higher than the first level, the determination unit determines that the facial recognition performed by the convolutional neural network is performed.

6. The authentication device according to claim 2, wherein when moving speed of a person that is an object to which the authentication process is performed is faster than a predetermined threshold, the determination unit determines that the facial recognition performed by the spherical convolutional neural network is performed, and when the moving speed is slower than the threshold, the determination unit determines that the facial recognition performed by the convolutional neural network is performed.

7. The authentication device according to claim 2, wherein when a value that relates to a number of people within an image-capturing range of the fisheye camera is greater than a predetermined threshold, the determination unit determines that the facial recognition performed by the spherical convolutional neural network is performed, and when the value is less than the threshold, the determination unit determines that the facial recognition performed by the convolutional neural network is performed.

8. The authentication device according to claim 1, wherein
the data acquisition unit acquires first spherical data including a video taken by a first fisheye camera, and second spherical data including a video taken by a second fisheye camera that is arranged at a position higher than that of the first fisheye camera, and
the authentication performing unit performs the facial recognition performed by the spherical convolutional neural network on at least any of the first spherical data or the second spherical data.

9. An authentication method performed by a computer, comprising:
acquiring spherical data including a video of a person taken by a fisheye camera;
tracking a position of a person included in the spherical data that is continuously acquired by the acquiring;
identifying, based on a tracking result obtained by the tracking, a person who is an object to which an authentication process is to be performed;
determining, for the person identified by the identifying, whether to perform facial recognition performed by a spherical convolutional neural network or perform facial recognition performed by a convolutional neural network; and
for the person identified by the identifying, performing facial recognition performed by the spherical convolutional neural network on the spherical data, when determining that the facial recognition performed by the spherical convolutional neural network is performed.

10. A non-transitory computer readable storage medium having a program stored thereon, the program causing a computer to perform the method of claim 9.

* * * * *